United States Patent [19]

Brown

[11] Patent Number: 4,831,087
[45] Date of Patent: May 16, 1989

[54] SOLVENT-RESISTANT, COMPATIBLE POLYPHENYLENE ETHER-THERMOPLASTIC POLYESTER BLENDS

[75] Inventor: Sterling B. Brown, Schenectady, N.Y.

[73] Assignee: General Electric Company, Schenectady, N.Y.

[21] Appl. No.: 184,329

[22] Filed: Apr. 21, 1988

[51] Int. Cl.$^4$ .............................................. C08L 71/04
[52] U.S. Cl. .................................... 525/394; 525/397; 525/905
[58] Field of Search ................ 525/394, 397, 905, 146

[56] References Cited

U.S. PATENT DOCUMENTS 4,369,136  1/1983  Robeson et al. ..................... 524/371

FOREIGN PATENT DOCUMENTS 57-209956  12/1982  Japan.
WO87/850  2/1987  PCT Int'l Appl.

Primary Examiner—Theodore E. Pertilla
Attorney, Agent, or Firm—William H. Pittman; James C. Davis, Jr.

[57] ABSTRACT

Resin blends with a wide variety of desirable tensile properties are prepared from a polyphenylene ether having a low proportion of unneutralized amino nitrogen; an elastomeric polyester or blend thereof with a poly(ethylene terephthalate) or poly(butylene terephthalate); and at least one polymer containing a substantial proportion of aromatic polycarbonate units as a compatibilizing agent. The blends are free from extraneous impact modifiers.

11 Claims, No Drawings

SOLVENT-RESISTANT, COMPATIBLE POLYPHENYLENE ETHER-THERMOPLASTIC POLYESTER BLENDS

This invention relates to novel resinous compositions with high solvent resistance, tensile strength and thermal stability. More particularly, it relates to improved compositions comprising polyphenylene ethers and thermoplastic polyesters.

The polyphenylene ethers are a widely used class of thermoplastic engineering resins characterized by excellent hydrolytic stability, dimensional stability, toughness, heat resistance and dielectric properties. They are also resistant to high temperature conditions under many circumstances.

In copending, commonly owned application Ser. No. 154,751, filed Feb. 9, 1988, there are disclosed highly compatible polyphenylene ether-polyester blends having excellent tensile properties and ductility and a high degree of impact resistance and solvent resistance. These blends comprise—in addition to at least one polyphenylene ether and a polyester blend comprising at least one poly(alkylene dicarboxylate) and at least one elastomeric polyester from a specific class thereof—at least one elastomeric polyphenylene ether-compatible impact modifier and at least one polymer containing a substantial proportion of aromatic polycarbonate units. Various other ingredients may also be present in preferred compositions within this genus.

The present invention provides similar polymer blends which are highly compatible and ductile and have a wide spectrum of tensile properties and in many instances, high solvent resistance. These blends are suitable for use in applications where impact strength is not an important consideration.

In one of its aspects, the invention is directed to resinous compositions free from extraneous impact modifiers and comprising the following resinous components and any reaction products thereof, all percentage proportions being by weight of total resinous components:

(A) about 15–50% of at least one polyphenylene ether containing at most 800 ppm. of unneutralized amino nitrogen;

(B) about 20–30% of at least one polyester selected from the group consisting of (B-1) those consisting essentially of structural units of the formulas

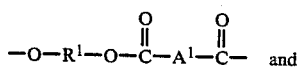 (I)

and

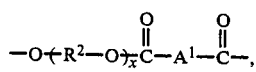 (II)

wherein $R^1$ is a saturated $C_{2-10}$ divalent aliphatic or alicyclic hydrocarbon radical, $R^2$ is a saturated $C_{2-4}$ divalent aliphatic hydrocarbon radical, $A^1$ is a divalent aromatic radical containing about 6–20 carbon atoms and x has an average value of at least 10; (B-2) those consisting essentially of units of formula I and units of the formula

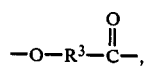 (III)

wherein $R^3$ is a $C_{3-6}$ saturated divalent aliphatic hydrocarbon radical; and blends of at least one components B-1 and B-2 with (B-3) polyesters consisting essentially of units of formula I; and (C) from 3% to about 50% of at least one polymer containing a substantial proportion of aromatic polycarbonate units and having a weight average molecular weight of at least about 40,000 as determined by gel permeation chromatography relative to polystyrene.

It is not certain whether any or all of the components in these compositions interact chemically upon blending. Therefore, the invention includes compositions comprising said components and any reaction products thereof, as well as other optional components described hereinafter.

The polyphenylene ethers (also known as polyphenylene oxides) used as component A in the present invention comprise a plurality of structural units having the formula

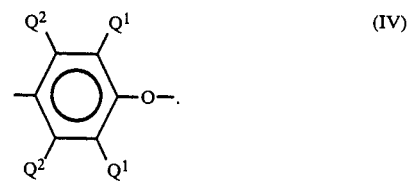 (IV)

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymer include random copolymers containing such units in combination with (for example) 2,3,6-trimethyl-1,4-phenylene ether units. Many suitable random copolymers, as well as homopolymers, as disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 and preferably at least 0.25 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

The polyphenylene ethers which may be used in the invention include those which comprise molecules having at least one of the end groups of the formulas

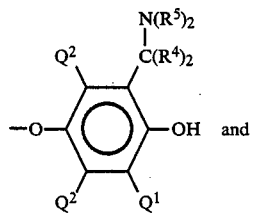
(V)

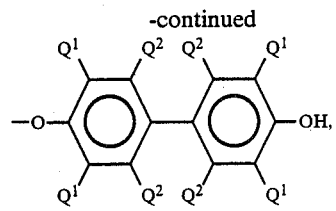
(VI)

wherein $Q^1$ and $Q^2$ are as previously defined; each $R^4$ is independently hydrogen or alkyl, with the proviso that the total number of carbon atoms in both $R^4$ radicals is 6 or less; and each $R^5$ is independently hydrogen or a $C_{1-6}$ primary alkyl radical. Preferably, each $R^4$ is hydrogen and each $R^5$ is alkyl, especially methyl or n-butyl.

Polymers containing the end groups of formula V (hereinafter "aminoalkyl end groups") may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl end groups may undergo various reactions, probably involving a quinone methide-type intermediate of the formula

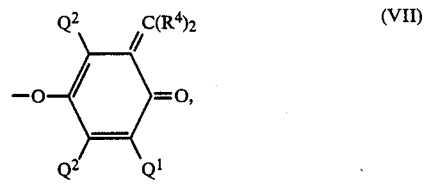
(VII)

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula VI are typically obtained from reaction mixtures in which a by-product diphenoquinone of the formula

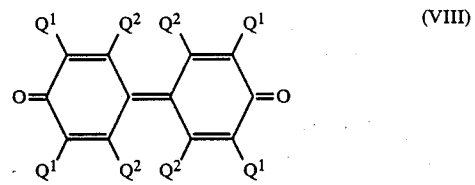
(VIII)

is present, especially in a copper-halide-secondary or tertiary amine system. In this regard, the disclosure of U.S. Pat. No. 4,477,649 is again pertinent as are those of U.S. Pat. No. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas V and VI. In particular, polyphenylene ethers originally containing at least about 60% by weight of molecules having aminoalkyl end groups of formula V are contemplated for use in the present invention.

The use of polyphenylene ethers containing substantial amounts of unneutralized amino nitrogen generally affords compositions with undesirably low impact strengths. The possible reasons for this are explained hereinafter. The amino compounds include, in addition to the aforementioned aminoalkyl end groups, traces of amine (particularly secondary amine) in the catalyst used to form the polyphenylene ether.

According to the present invention, therefore, a substantial proportion of any amino compounds in the polyphenylene ether is removed or inactivated. Polymers so treated are sometimes referred to hereinafter as "inactivated polyphenylene ethers". They contain unneutralized amino nitrogen, if any, in amounts no greater than 800 ppm. and more preferably in the range of about 100–800 ppm. Various means for inactivation have been developed and any one or more thereof may be used.

One such method is to precompound the polyphenylene ether with at least one non-volatile compound containing a carboxylic acid, acid anhydride or ester group, which is capable of neutralizing the amine compounds. This method is of particular interest in the preparation of compositions of this invention having high resistance to heat distortion. Illustrative acids, anhydrides and esters are citric acid, maleic acid, agaricic acid, succinic acid, succinic anhydride, maleic acid, maleic anhydride, diethyl maleate, citraconic acid, citraconic anhydride, itaconic acid, itaconic anhydride, fumaric acid, methyl fumarate and pyromellitic dianhydride. Because of their relatively high reactivity with amino compounds, the free carboxylic acids and their anhydrides, especially fumaric acid and pyromellitic dianhydride, are generally most useful.

Reaction of the polyphenylene ether with the acid or anhydride may be achieved by heating at a temperature within the range of about 230°–390° C., in solution or preferably in the melt. In general, about 0.3–2.0 and preferably about 0.5–1.5 parts (by weight) of acid or anhydride is employed per 100 parts of polyphenylene ether. Said reaction may conveniently be carried out in an extruder or similar equipment.

Another method of inactivation is by extrusion of the polyphenylene ether under the above-described conditions with vacuum venting. This may be achieved either in a preliminary extrusion step (which is sometimes preferred) or during extrusion of the composition of this invention, by connecting the vent of the extruder to a vacuum pump capable of creating a pressure of about 200 torr or less.

It is believed that these inactivation methods aid in the removal by evaporation or the neutralization of any traces of free amines (predominantly secondary amines) in the polymer, including amines generated by conversion of aminoalkyl end groups to quinone methides of the type represented by formula VII. Polyphenylene ethers having a free amine nitrogen content below about 600 ppm. have been found particularly useful in this invention. However, the invention is not dependent on any theory of inactivation.

Component B is at least one thermoplastic polyester comprising structural units of formula I. In one embodiment of the invention, said polyester also contains units of formula II or III (components B-1 and B-2). The $R^1$ value in formula I is a $C_{2-10}$ saturated divalent aliphatic or alicyclic hydrocarbon radical, usually ethylene or tetramethylene, and $A^1$ is a divalent aromatic radical containing about 6–20 carbon atoms and preferably phenylene.

In another embodiment, component B-1 and/or B-2 is employed in admixture with (B-3) a polyester consisting essentially of units of formula I. The polyesters useful as component B-3 generally have number average molecular weights in the range of about 20,000–70,000, as determined by intrinsic viscosity (IV) at 30° C. in a mixture of 60% (by weight) phenol and 40% 1,1,2,2-tetrachloroethane. When resistance to heat distortion is an important factor the polyester molecular weight should be relatively high, typically above about 40,000. Poly(ethylene terephthalate) and poly(butylene terephthalate), especially the latter, are preferred.

Components B-1, B-2 and B-3 (when employed) may be present in component B in any proportions; usually, component B-1 or B-2 comprises at least about 5%, most often about 10–90% and preferably about 30–70% by weight of component B, with the balance being component B-3. The units of formulas II and III generally comprise at least about 15% by weight of total component B. Thus, a spectrum of products with varying impact and tensile properties may be obtained.

Polyesters frequently tend to undergo hydrolytic degradation at the high extrusion and molding temperatures encountered by the compositions of this invention. Therefore, it is preferred that the polyester used as component B be substantially free of water.

Because of the presence of both polyesters and polymers containing carbonate units in the compositions of this invention, there is a possibility for ester-carbonate exchange resulting in degradation of one or both polymers, particularly at high molding temperatures. It is, therefore, sometimes preferred to incorporate in the compositions an agent which suppresses such exchange, typically in the amount of about 0.01–7.5% by weight of total polyester. It is generally preferred to precompound said exchange suppressing agent with the polyester, since it is frequently found that the impact strengths of the compositions of this invention are substantially decreased if the exchange suppressing agent is incorporated directly therein. Precompounding may be achieved by direct blending or by forming a concentrate, typically with about 1–25% by weight of total polyester, and adding said concentrate to the remaining portion thereof.

Illustrative exchange suppressing agents are hydroxyaromatic compounds such as the hydroxybenzophenones disclosed in U.S. Pat. No. 4,452,932; salicylate compounds such as methyl salicylate, disclosed in U.S. Pat. No. 4,452,933; and sodium and potassium dihydrogen phosphates disclosed in U.S. Pat. No. 4,532,290. The disclosures of all of the foregoing patents relating to polyesters are also incorporated by reference herein.

According to the present invention, the tendency of blends of components A and B to be incompatible is overcome by incorporating component C in the composition. The essential ingredient of component C is a polymer containing a substantial proportion of aromatic polycarbonate units.

Among the preferred polymers of this type are the aromatic polycarbonate homopolymers. The structural units in such homopolymers generally have the formula

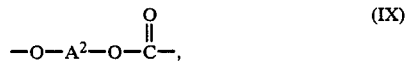

wherein $A^2$ is an aromatic radical. Suitable $A^2$ values include m-phenylene, p-phenylene, 4,4'-biphenylene, 2,2-bis(4-phenylene)propane, 2,2-bis(3,5-dimethyl-4-phenylene)-propane and similar radicals such as those which correspond to the dihydroxyaromatic compounds disclosed by name or formula (generic or specific) in U.S. Pat. No. 4,217,438. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $A^2$ radicals are hydrocarbon radicals.

The $A^2$ radicals preferably have the formula $$-A^3-Y-A^4-, \quad (X)$$

wherein each of $A^3$ and $A^4$ is a single-ring divalent aromatic radical and Y is a bridging radical in which one or two atoms separate $A^3$ from $A^4$. The free valence bonds in formula X are usually in the meta or para positions of $A^3$ and $A^4$ in relation to Y. Such $A^2$ values may be considered as being derived from bisphenols of the formula $HO-A^3-Y-A^4OH$. Frequent reference to bisphenols will be made hereinafter, but it should be understood that $A^2$ values derived from suitable compounds other than bisphenols may be employed as appropriate.

In formula X, the $A^3$ and $A^4$ values may be unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^3$ and $A^4$ are preferably p-phenylene, although both may be o- or m-phenylene or one o- or m-phenylene and the other p-phenylene.

The bridging radical, Y, is one in which one or two atoms, preferably one, separate $A^3$ from $A^4$. It is most often a hydrocarbon radical and particularly a saturated radical such as methylene, cyclohexylmethylene, 2-[2.2.1]-bicycloheptylmethylene, ethylene, 2,2-propylene, 1,1-(2,2-dimethylpropylene), 1,1-cyclohexylene, 1,1-cyclopentadecylene, 1,1-cyclododecylene or 2,2-adamantylene, especially a gem-alkylene radical. Also included, however, are unsaturated radicals and radicals which are entirely or partially composed of atoms other than carbon and hydrogen. Examples of such radicals are 2,2-dichloroethylidene, carbonyl, thio and sulfone. For reasons of availability and particular suitability for the purposes of this invention, the preferred radical of formula IX is the 2,2-bis(4-phenylene)propane radical, which is derived from bisphenol A and in which Y is isopropylidene and $A^3$ and $A^4$ are each p-phenylene.

Various methods of preparing polycarbonate homopolymers are known, and any of them may be used for preparing component C. They include interfacial and other methods in which phosgene is reacted with bisphenols, transesterification methods in which bisphenols are reacted with diaryl carbonates, and method involving conversion of cyclic polycarbonate oligomers to linear polycarbonates. The latter method is disclosed in U.S. Pat. Nos. 4,605,731 and 4,644,053.

Various copolycarbonates are also useful as component C. One example thereof is the polyester-polycarbonates of the type obtained by the reaction of at least one dihydroxyaromatic compound with a mixture of phosgene and at least one dicarboxylic acid chloride, especially isophthaloyl chloride, terephthaloyl chloride or both. Such polyester-polycarbonates contain structural units of formula IX combined with units of the formula

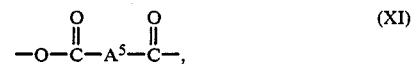

wherein $A^5$ is an aromatic and usually a p- or m-phenylene radical. Other examples are the siloxane-carbonate block copolymers disclosed, for example, in U.S. Pat. Nos. 3,189,662 and 3,419,634, and the polyphenylene ether-polycarbonate block copolymers of U.S. Pat. Nos. 4,374,223 and 4,436,876, which frequently provide compositions with substantially higher heat distortion temperatures than those containing homopolycarbonates. The disclosures of the patents and applications listed above relating to polycarbonates and copolycarbonates are also incorporated by reference herein.

The copolycarbonates should, for the most part, contain at least about 20% by weight of carbonate structural units. When the copolymeric units are other than ester units, the polymer preferably contains at least about 45% carbonate units.

The weight average molecular weight of the homo- or copolycarbonate should be at least about 40,000 (as determined by gel permeation chromatography relative to polystyrene). It is most often in the range of about 40,000-80,000 and especially about 60,000-80,000. However, compositions in which component C has a molecular weight in the range of about 80,000-200,000 often have favorable properties.

In most instances, component C consists of the polycarbonate or copolycarbonate; that is, said polymer is the entire component except for impurities. It is within the scope of the invention, however, to use as component C a blend of a polycarbonate or polyester-polycarbonate with a styrene homopolymer, typically having a number average molecular weight of about 50,000-250,000. Such blends generally contain at least 50% of the polycarbonate or polyester-polycarbonate.

It is also within the scope of the invention to employ a polyester-aromatic polycarbonate blend as a source of part or all of components B and C. The use of such a blend may provide somewhat more flexibility in component proportions.

An essential feature of the invention is the absence of extraneous impact modifiers; that is, of polymers which improve impact strength and which are not defined herein as suitable constituents of one of the components of the composition. Such impact modifiers are typically elastomeric polymers, including such materials as styrene-butadiene diblock and triblock polymers. Compositions containing such impact modifiers are disclosed and claimed in the aforementioned application Ser. No. 154,751. The invention is based in part on the discovery that compositions free from extraneous impact modifiers are suitable for use when impact strength is not critical but such factors as tensile properties are important.

In various respects, the proportions of ingredients in the compositions of this invention are an important consideration. As previously mentioned, the proportions of components A and B are about 15-50% and about 20-80%, respectively, and that of component C is from 3% to about 50%. The preferred ranges are about 20-40% for component A, about 25-75% for component B, and about 5-40% for component C.

The chemical role of the inactivated polyphenylene ether in the compositions of this invention is not fully understood, and any reliance on chemical theory as a basis for the invention is specifically disclaimed. It is believed, however, that the presence of more than a certain minimum proportion of amino compounds in the polyphenylene ether can cause degradation in the molecular weight of the polycarbonate and polyester. Such amino compounds include, in addition to the aminoalkyl end groups, traces of amines (particularly secondary amine) in the catalyst used to form the polyphenylene ether. If this is true, the removal or neutralization of the greater part of such amino compounds produces an environment in which high molecular weight is maintained in the polyester and in the polycarbonate, thus maximizing its effect as a compatibilizing agent.

It is within the scope of the invention for the composition to contain other conventional ingredients such as fillers, reinforcing materials (e.g, glass fibers), flame retardants, pigments, dyes, stabilizers, anti-static agents, mold release agents and the like. Also included are processability modifiers for component A, such as olefin copolymers. In general, the amounts of any other resinous components, if present, will not exceed about 15% by weight of total resin.

The preparation of the compositions of this invention is normally achieved by merely blending the ingredients thereof under conditions adapted for the formation of an intimate blend. Such conditions often include extrusion, which may be conveniently effected in a screw-type or similar extruder which applies a substantial shearing force to the composition, thereby decreasing the particle size thereof. The extrusion temperature is generally in the range of about 100°-325° C.

In one embodiment of the invention, a single extruder is employed which has at least two ports for introduction of ingredients, one such port being downstream from the other. Component A or any reactants for preparation thereof is introduced through the first port and extruded, preferably at a temperature in the range of about 300°-350° C. This portion of the extruder is preferably vacuum vented.

The remaining ingredients are introduced through the downstream port and extrusion is continued, preferably at a lower temperature to minimize degradation of component B. Typical extrusion temperatures at this stage are in the range of about 250°-320° C.

In the following examples illustrating the inventions, the blend constituents used were as follows:

Component A:
a poly(2,6-dimethyl-1,4-phenylene ether) having a number average molecular weight of about 20,000 and an intrinsic viscosity in chloroform at 25° C. of 0.46 dl./g., which has been extruded on a twin screw extruder within the temperature range of about 300°-315° C., with vacuum venting to a maximum pressure of 20 torr; it contained 438 ppm. nitrogen.

Component B:
PBT—a poly(butylene terephthalate) having a number average molecular weight of about 50,000, as determined by gel permeation chromatography.

PBT-CL—a commercially available poly(butylene terephthalate)-caprolactone copolyester containing about 72 mole percent butylene terephthalate units and about 28 mole percent caprolactone units.

PTME(50,000) and PTME(54,000)—commercially available elastomeric polyterephthalates from mixtures of tetramethylene glycol and poly(tetramethylene ether) glycol, having the designated number average molecular weights and about 20% and 50% by weight, respectively, of poly(tetramethylene ether) glycol units.

Component C:
PC(71,000) and PC(192,000)—bisphenol A homopolycarbonates prepared interfacially and having the designated weight average molecular weights.

Percentages and other proportions in the examples are by weight and are based on total resinous constituents. Impact and tensile values were determined in British units and have been converted to metric units. Heat distortion temperatures are at 0.455 MPa. unless otherwise indicated.

Examples 1-5

A series of compositions according to the invention were prepared by tumble mixing the ingredients in a jar mill for ½ hour and extruding at 257°-268° C. on a twin screw extruder with a screw speed of 400 rpm. The extrudate was quenched in water and pelletized. The pellets were then injection molded into test bars which were evaluated for heat distortion temperature and tensile properties (ASTM procedures D648 and D638, respectively). The relevant parameters and test results are given in Table I.

TABLE I

| | | | | | |
|---|---|---|---|---|---|
| Component A, % | 34.7 | 34.7 | 34.7 | 36 | 36 |
| Component B, %: | | | | | |
| PBT | 26.7 | 26.7 | 26.7 | 14 | 14 |
| PBT-CL | — | — | 26.7 | — | — |
| PTME(50,000) | — | 26.7 | — | — | 14 |
| PTME(54,000) | 26.7 | — | — | 14 | — |
| Component C, %: | | | | | |
| PC(71,000) | — | — | — | 36 | 36 |
| PC(192,000) | 11.9 | 11.9 | 11.9 | — | — |
| Tensile strength, MPa.: | | | | | |
| At yield | — | — | 46.1 | — | 57.9 |
| At break | 25.7 | 45.4 | 37.8 | 45.7 | 45.9 |
| Tensile elongation, % | 26 | 12 | 53 | 8 | 54 |

What is claimed is:

1. A resinous composition free from extraneous impact modifiers and comprising the following resinous components and any reaction products thereof, all percentage proportions being by weight of total resinous components:

(A) about 15-50% of at least one polyphenylene ether containing at most 800 ppm. of unneutralized amino nitrogen, said polyphenylene ether consisting essentially of structural units having the formula

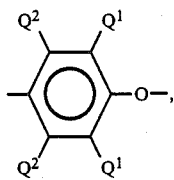

wherein in each of said units independently, each $Q^1$ is independently primary or secondary lower alkyl or phenyl and each $Q^2$ is independently hydrogen, primary or secondary lower alkyl or phenyl;

(B) about 20–80% of at least one polyester selected from the group consisting of (B-1) those consisting essentially of structural units of the formulas

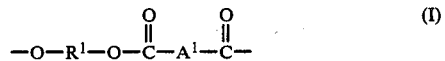

and

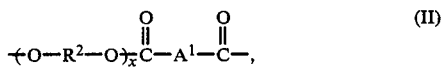

wherein $R^1$ is a saturated $C_{2-10}$ divalent aliphatic or alicyclic hydrocarbon radical, $R^2$ is a saturated $C_{2-4}$ divalent aliphatic hydrocarbon radical, $A^1$ is a divalent aromatic radical containing about 6–20 carbon atoms and x has an average value of at least 10; (B-2) those consisting essentially of units of formula I and units of the formula

wherein $R^3$ is a $C_{3-6}$ saturated divalent aliphatic hydrocarbon radical; and blends of at least one of components B-1 and B-2 with (B-3) polyesters consisting essentially of units of formula I; and (C) from 3% to about 50% of at least one polymer containing a substantial proportion of aromatic polycarbonate units and having a weight average molecular weight of at least about 40,000 as determined by gel permeation chromatography relative to polystyrene.

2. A composition according to claim 1 wherein component A is a poly(2,6-dimethyl-1,4-phenylene ether).

3. A composition according to claim 2 which comprises about 20–40% of component A, about 25–75% of component B and about 5–40% of component C.

4. A composition according to claim 3 wherein component B comprises about 30–70% of component B-1 or B-2, based on total component B, with the balance being component B-3.

5. A composition according to claim 4 wherein component B-3 is poly(ethylene terephthalate) or poly(butylene terephthalate).

6. A composition according to claim 5 wherein component B consists of components B-1 and B-3, $R^2$ is tetramethylene and $A^1$ is m- or p-phenylene.

7. A composition according to claim 6 wherein component B-3 is a poly(butylene terephthalate) having a number average molecular weight in the range of about 20,000–70,000.

8. A composition according to claim 7 wherein component C is a homopolycarbonate having a weight average molecular weight in the range of about 60,000–200,000.

9. A composition according to claim 5 wherein component B consists of components B-2 and B-3, $R^3$ is pentamethylene and $A^1$ is m- or p-phenylene.

10. A composition according to claim 9 wherein component B-3 is a poly(butylene terephthalate) having a number average molecular weight in the range of about 20,000–70,000.

11. A composition according to claim 10 wherein component C is a homopolycarbonate having a weight average molecular weight in the range of about 60,000–200,000.

* * * * *